United States Patent
Morbidelli

[11] Patent Number: 5,214,974
[45] Date of Patent: Jun. 1, 1993

[54] DESMODROMIC-TYPE CHANGE GEAR

[75] Inventor: Giancarlo Morbidelli, Pesaro, Italy

[73] Assignee: Morbidelli S.p.A., Pesaro, Italy

[21] Appl. No.: 861,652

[22] Filed: Apr. 1, 1992

[30] Foreign Application Priority Data

Apr. 12, 1991 [IT] Italy ................. 118/91[U]

[51] Int. Cl.$^5$ ............................. F16H 3/08
[52] U.S. Cl. ......................... 74/371; 74/372; 192/96
[58] Field of Search .............. 74/371, 372; 192/96

[56] References Cited

U.S. PATENT DOCUMENTS

| | | |
|---|---|---|
| 1,410,347 | 3/1922 | Pope . |
| 1,872,862 | 8/1932 | Wise .................. 74/372 X |
| 2,861,461 | 11/1958 | Kreidler ............ 74/371 R |
| 4,141,424 | 2/1979 | Murayama et al. ........ 74/372 X |
| 4,395,240 | 7/1983 | Blanchard ............. 74/371 X |
| 4,771,636 | 9/1988 | Fujita ................. 74/371 R |

FOREIGN PATENT DOCUMENTS 0391604  3/1990  European Pat. Off. .
63178    5/1949  Netherlands .

Primary Examiner—Leslie A. Braun
Assistant Examiner—Daniel Wittels
Attorney, Agent, or Firm—Darby & Darby

[57] ABSTRACT

The invention relates to a central shaft (7) with desmodromic channels, coaxial and internal to a driven shaft (1), slidable in the two directions and exhibiting a plurality of longitudinal grooves (8) inside which, for every second cogged wheel (2) a corresponding plurality of heads (9a) of pivots (9) are housed and blocked, which pivot heads (9a) are destined to exit, with their free end and on a longitudinal sliding action of the said central shaft (7), from corresponding radial seats (10) realized on the said driven shaft (1); to key each single cogged wheel (2) to the said driven shaft (1), locking means (11) are envisaged in rotation, arranged on each second cogged wheel (2) and acting on each pivots (9) which exits.

7 Claims, 4 Drawing Sheets

DESMODROMIC-TYPE CHANGE GEAR

BACKGROUND of the INVENTION.

The invention relates to a single-control change gear of the desmodromic type, usable in particular in motor vehicles.

At present in the field of mechanics different devices are used which permit of varying, at the driver's will, the movement velocity ratio between the origin of the said movement and the user element, or more precisely to vary the velocity ratio, that is the ratio between the velocity of the driven organ and the drive organ.

For example, as regards motor vehicles, the above-mentioned organs are constituted by: a main shaft, rotated directly by the drive shaft, on which main shaft a series of cogged wheels are arranged, coaxially and keyed on to the said main shaft, said cogged wheels being equivalent in number to the number of ratios which are present in and can be effected by the gearshift device; a driven shaft, arranged parallel to the main shaft, also equipped with a corresponding series of normally idle cogged wheels and in constant mesh with the preceding cogged wheels. Between the shaft pair and the drive shaft a friction device is interposed, with which it is possible to connect the entire change group to the said drive shaft; to perform the engagement of the various ratios between the main shaft and the driven shaft there are various solutions and the most frequently used of these comprise a key or a plurality of ball bearings: the first uses a longitudinally sliding key internal to the driven shaft, activated by means of the usual lever mechanisms constituted by a fork shift manoeuvrable by the operator, with which for each gear change one of the cogged wheels is keyed to the driven shaft. The second of the above solutions envisages a slidable spindle, as above longitudinally slidable internally to the driven shaft, moved by the user (still by means of the fork-shift) and destined to mesh, as above for every gear change, the selected cogged wheel by means of a plurality of ball-bearings arranged radially to the shaft and interpositionable between the said shaft and the cogged wheel.

All of these solutions are, however, mechanically weak, in that the driven shaft is realised either with a longitudinal groove of considerable dimensions to permit of the passing 05 of the key, or with a plurality of circular apertures distributed on the circumference for containing the ball bearings; furthermore, the driven shaft in the case in which numerous velocity ratios are used, would tend to bend, given the considerable length that would be necessary to position all of the wheels, or might require the use of intermediate supports which would lead to a further increasing of the dimensions of the gearshift group.

Thus, such solutions can exclusively be used for transmissions of lesser power and having a small number of velocity ratios, in order not to act negatively on the shaft length.

The aim of the present invention is to eliminate the above-described drawbacks, by providing a change gear with a command shaft equipped with desmodromic-type meshes, compact in its dimensions, especially in its axial dimensions, precise and fast in its meshing and thus able to permit of a high number of velocity ratios.

A further aim of the present invention is to realise a change gear with regularly distributed meshes along the circumference of the command shaft so as not negatively to influence the change gear's strength; this leads to the possibility of transmitting high couples between the motor and the transmission.

SUMMARY of the INVENTION.

The invention, as it is characterised in the claims which follow, solves the above-described problems by providing a change gear comprising a shaft with desmodromic channels, slideable in both directions and coaxial internally to a second shaft, which second shaft exhibits a plurality of longitudinal grooves inside which a corresponding plurality of pivot heads are housed and blocked bilaterally for each second cogged wheel, which pivot heads exit with their free end and on the longitudinally-sliding action of the shaft from corresponding radial holes bored into the second shaft for the blocking of the said second shaft; also envisaged are locking means in rotation, realised on each second cogged wheel and acting on each pivot so as to permit of stable keying between the said cogged wheel and the second shaft at the exiting of the said pivots.

BRIEF DESCRIPTION of the DRAWINGS.

The advantages and characteristics of the present invention will better emerge in the detailed description that follows, made with reference to the illustrations, which represent a preferred but non-exclusive and non-limiting embodiment, in which.

Figure 1:
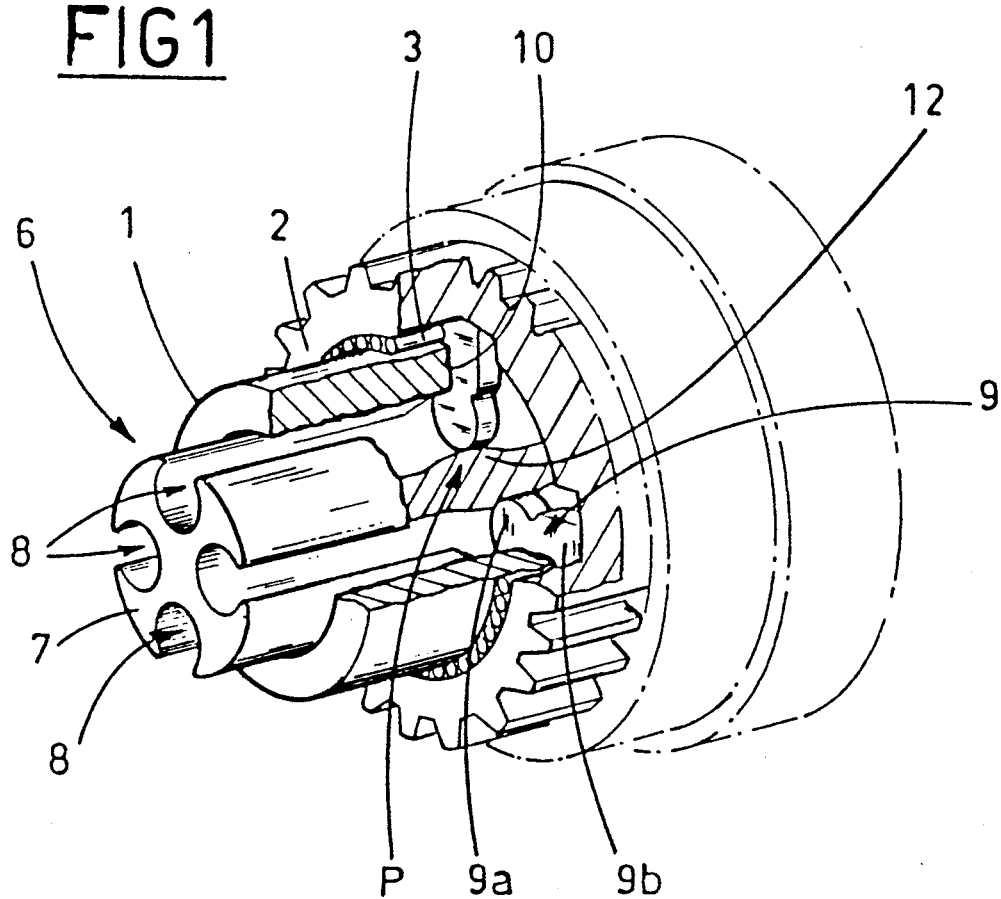
FIG. 1 illustrates, in a perspective view and with some parts removed better to evidence others, the desmodromic change gear object of the present invention.

DESCRIPTION of the PREFERRED EMBODIMENTS.

With reference to the figures, the gearshift object of the present invention comprises (see FIGS. 1 and 2) a first cylindrical shaft or main shaft 5, rotatable about its longitudinal axis, which main shaft 5 is couplable in rotation to a drive shaft through a clutch group (not illustrated because of known type and not being a part of the invention), to which drive shaft a plurality of first cogged wheels 4 having different numbers of teeth are keyed coaxially and therefore in constant mesh. Parallel to the said main shaft 5 a second cylindrical transmission shaft, or driven shaft 1 is arranged, rotatable about its own longitudinal axis, to which driven shaft 1 a plurality of second cogged wheels 2 are coaxially coupled, which second cogged wheels 2, like the first cogged wheels 4, have differing numbers of teeth; each of the said second cogged wheels 2 being rotatably idle on the said driven shaft by means of a corresponding roller separator 3, or more simply by means of a roller bearing, partially interposed between the relative second clogged wheel 2 and the driven shaft 1. Each of the said second cogged wheels 2 (in the case in example only three cogged wheels are illustrated purely for the sake of providing a non-limiting example), is meshed to a corresponding first cogged wheel 4 keyed to the main shaft 5 in such a way as to define a precise velocity ratio between the two shafts 1 and 5.

Figure 2:
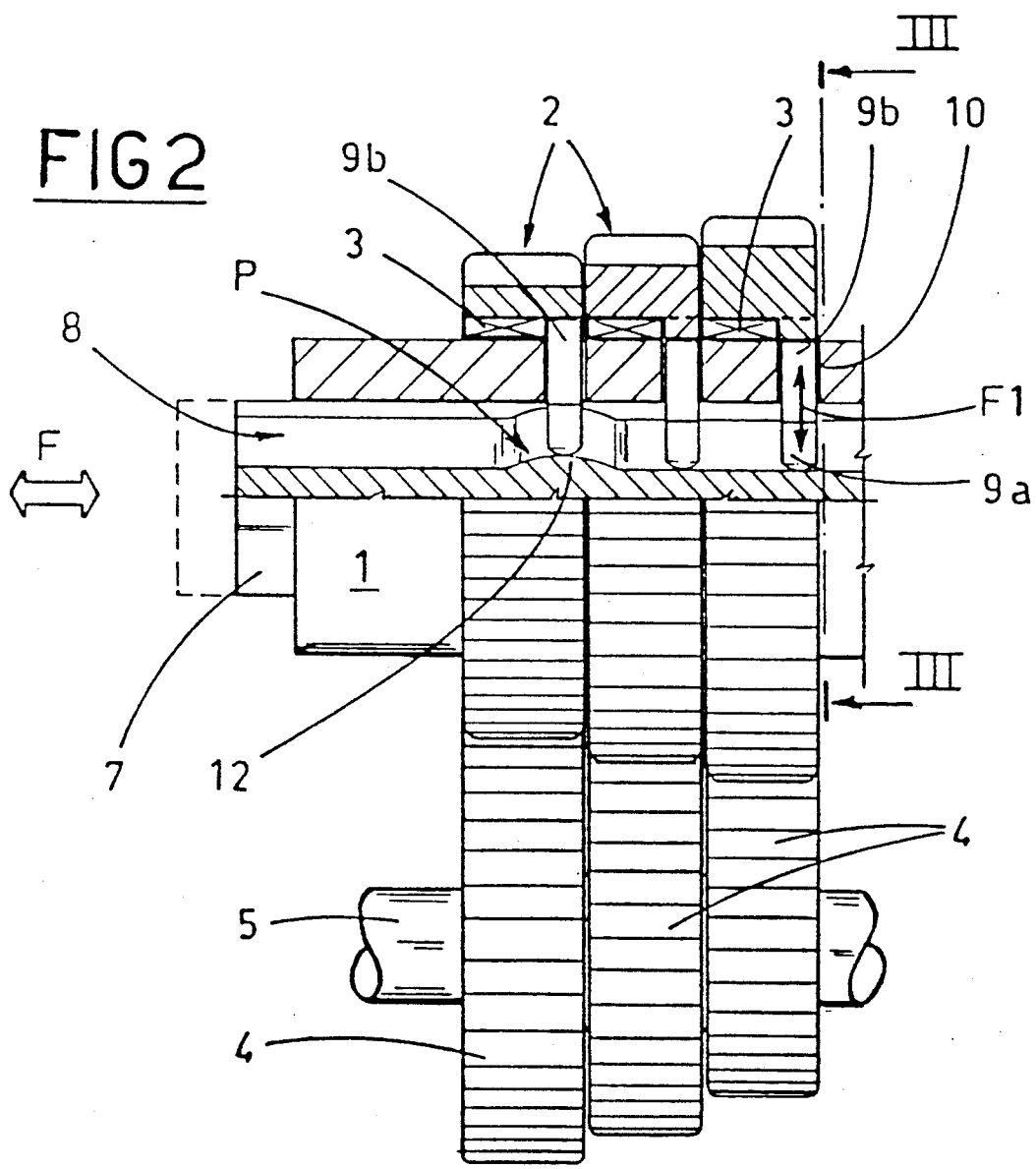
FIG. 2 illustrates, in a side view with some parts removed in order better to evidence others, the change FIG. 1.
Figure 6:
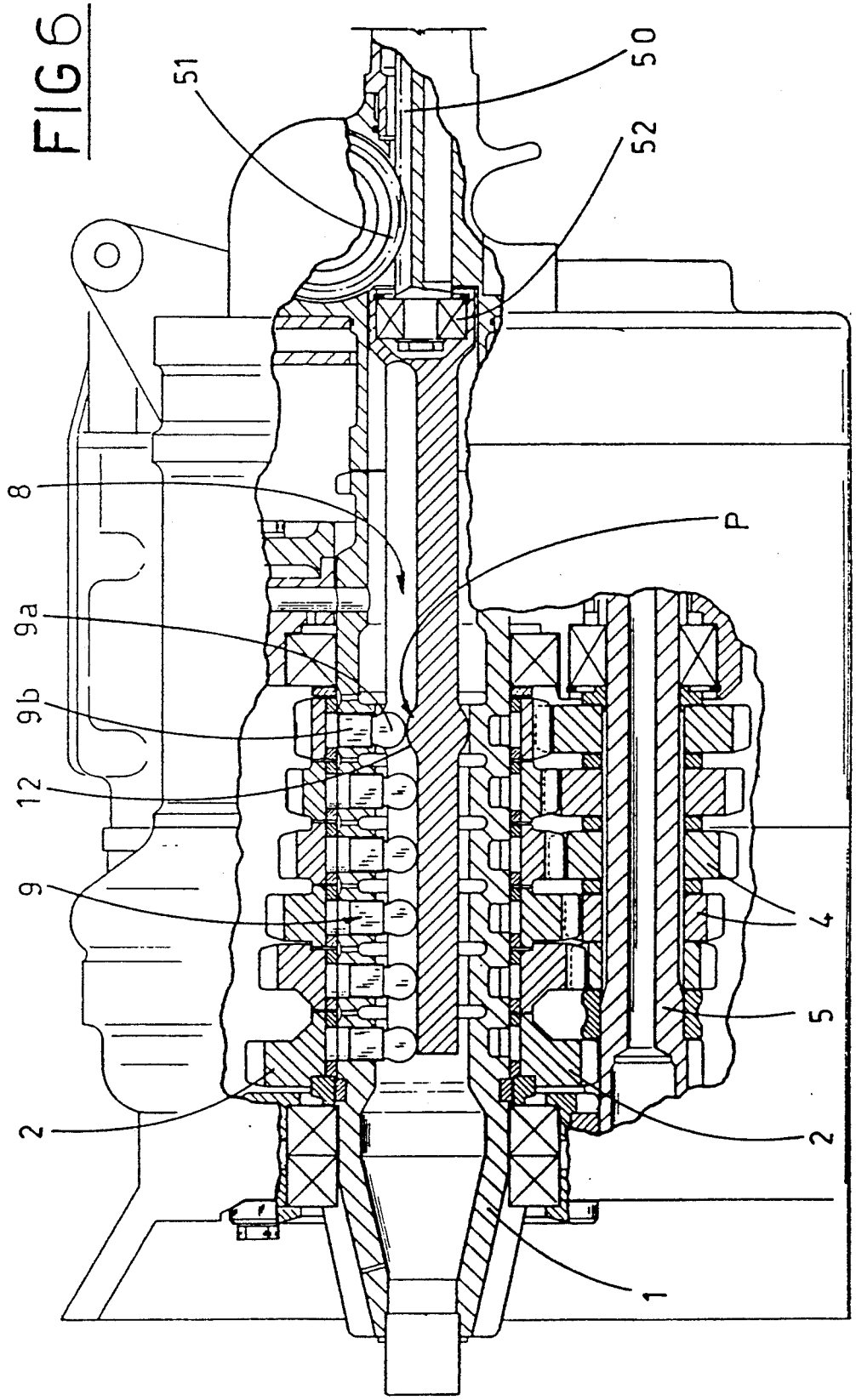
FIG. 6 illustrates, in a longitudinal section view, with some parts removed better to evidence others, a gearbox of a motor vehicle equipped with the change gear object of this invention.

In FIGS. 1 and 2, 6 denotes stable keying means between each of the second cogged wheels 2 and the driven shaft 1, which keying means 6 are envisaged internally to the said driven shaft 1 so as to permit of a time-by-time selection of a cogged wheel 2 to give a differing number of revolutions to the motor.

Figure 3:
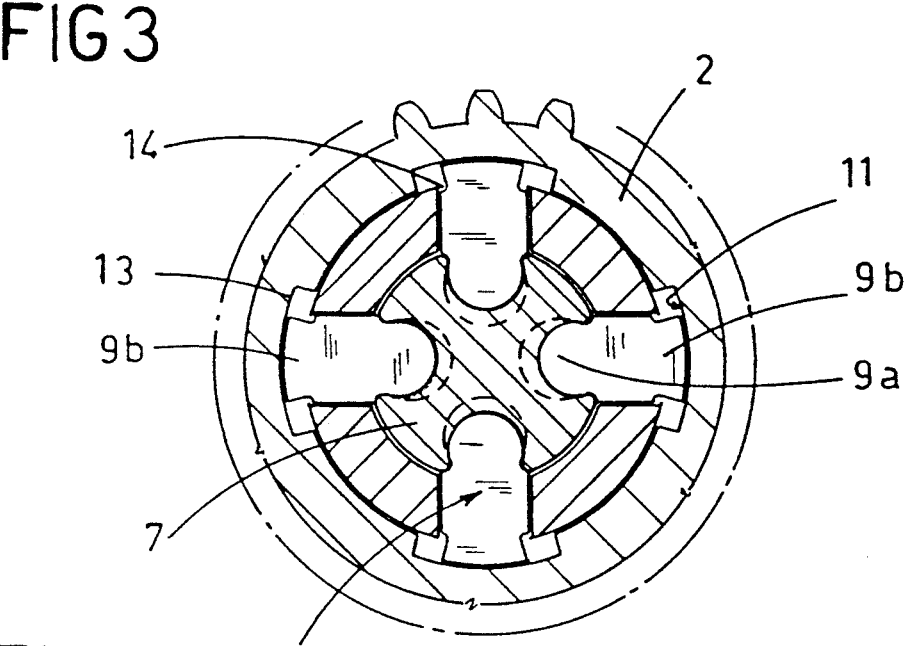
FIG. 3 illustrates a section along line III—III of FIG. 2.
Figure 4:
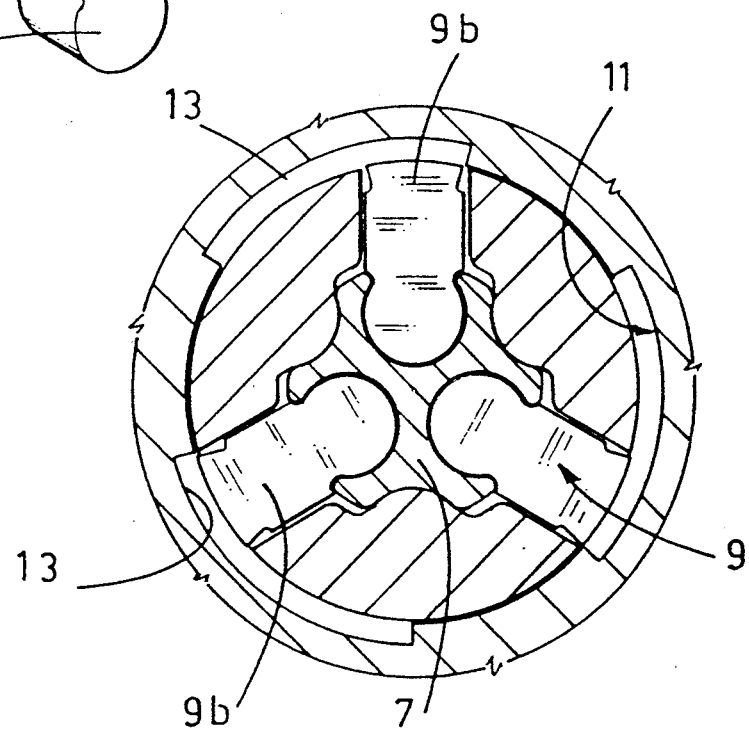
FIG. 4 illustrates, in a frontal view with some parts removed better to evidence others, a constructional variant of the change gear of the previous figures.

More precisely, the said keying means 6 are constituted by a third shaft 7 meshed coaxially and slideable in both senses internally to the driven shaft 1 (see arrow F in FIG. 2); the said third shaft 7 exhibits a plurality of superiorly open longitudinal grooves 8 inside which for each second cogged wheel 2 present on the said third shaft 7 there is a corresponding plurality of pivot 9 heads 9a lodged and blocked bilaterally in a radial direction; said pivot heads 9a are arranged perpendicular with respect to the said third shaft 7, that is, radially to the said driven shaft 1: thus we may affirm that the coupling between the pivots 9 and the third shaft 7, being constituted by a bilateral radial constraint, is of the desmodromic type. In FIG. 4 the third shaft 7 exhibits three longitudinal grooves 8 having circular section (so as to permit of bilateral blocking) angularly equidistanced one from the other, but the number of longitudinal grooves 8 may vary according to the needs of the couples to be transmitted or the constructive variations to be respected: for example, in FIGS. 1 and 3, four desmodromic longitudinal grooves 8 are illustrated, still having circular section and angularly equidistanced one from the other, between which, obviously, four pivot heads 9a for each of the said second cogged wheels 2 present can slide.

Figure 5:
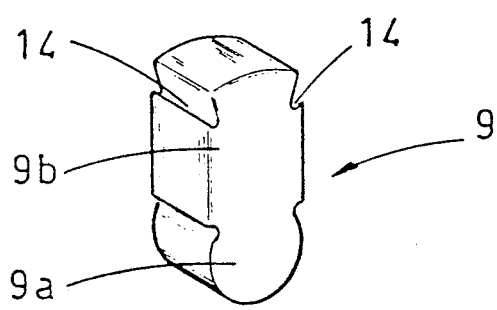
FIG. 5 illustrates, in perspective view, a constructional particular of the change gear of the previous figures.

The said pivots 9 can exit with their free end and on action of the third shaft with desmodromic grooves 8 from corresponding radial seats 10 realised on the said driven shaft 1; each of the said pivots 9 is constituted by the above-described pivot heads 9a with circular conformation (for perfect coupling with the said longitudinal grooves 8) and by a body 9b having a flat quadrangular conformation (see FIG. 5), exhibiting a pair of bilateral back drafts 14 (whose use will be explained hereinafter).

To permit of the exiting of the pivots 9, the third shaft 7 is equipped with a diametral variation of its profile (indicated with P in FIG. 2), defined by a circular protuberance 12, or circumferential enlargement, realised at an intermediate point in the said third shaft 7, having axial dimensions which are lower than the interaxis between two contiguous cogged wheels, in such a way as to permit, upon the above-described longitudinal sliding, of the exiting of one only series of pivots 9 from the radial seats 10, which pivots 9 correspond to the second cogged wheels 2 concerned.

11 denotes locking means in rotation, which are envisaged between each second cogged wheel 2 and between the corresponding pivots 9 so as to permit of stable keying between the said cogged wheel 2 and the driven shaft 1 on the exiting of the pivots 9. The said locking means 11 are realised by a plurality of circumferential notches 13 made on the internal diameter of each of the said second cogged wheels 2 in a number which corresponds to the said pivots 9 used (three or four as can be seen in FIGS. 3 and 4).

The said notches 13 permit, in effect, of stable keying to the said pivots 9 of one of the said second cogged wheels 2 to the said driven shaft on the exiting of the pivots 9; the locking of the said pivots 9 to the cogged wheel 2 is made more precise and successively stabler thanks to the back drafts 14 of the body 9b which permit of gripping the end of the corresponding notch 13. The said back drafts 14 can be realised with an angulation which is variable from 1° to 5° but is preferably 3°.

The functioning of a gear change thus structured is visible in practice in FIG. 6, and is as follows: with the motor functioning at speed with the change group disengaged from the driven shaft 1, there is a configuration of the change gear in which the driven shaft 1 rotates at a determined number of revolutions, while the second cogged wheels 2 rotate with a differentiated number of revolutions according to the type of ratio existing with the corresponding first cogged wheel 4.

In order to engage the lowest velocity ratio (that is, first gear), the operator must act on the lever clutch (not illustrated since of known lever type), with which it is possible, in the case illustrated, to cause the central shaft 7 to slide backwards, see arrow F, permitting thus the engagement, according to arrow F1, of the (in this case) three pivots 9 in the corresponding second cogged wheel 2 by means of the circumferential enlargement P, consequently bringing the main shaft 5 to key directly with the said cogged wheel 2 and thus bring it up to the number of revolutions realised by the velocity ratio given by the first 4 and the second 2 cogged wheel when enmeshed. Obviously all of the remaining gears are engaged and successively disengaged, that is in change-down or acceleration, according to this movement criterion of the shaft having desmodromic channels which permits, at each change, the keying or the unlocking of the various cogged wheels 2 from the main shaft 5 by commanding both the exit and the entrance of the pivots 9 from the driven shaft 1.

FIG. 6 shows the simplicity of the solution object of this invention, which envisages one only command element for the engagement of the various gears (the central shaft 7, and not a plurality of fork-lever mechanisms, as in the previous transmission changes having high ratios). The axial activating of the said central shaft 7 may be realised through kinematic rack 50—worm 51 motion: the said rack 50, being subjected to simple axial sliding movement, will be coupled with the central shaft 7 by means of a roller bearing 52. The activating of the worm 51, though not illustrated, can be performed by means of an electro-pneumatic command device (commandable directly by the operator) coaxial to the said worm 51: this kind of device permits of rotary movement of the worm 51 at considerable velocity and with single angular value equal to the interaxis of two contiguous cogged wheels 2, with consequent advantages both in the engagement and in the disengagement of the pivots 9 of the various ratios.

Thus a change gear structured in this way is mechanically very strong, in that the driven shaft 1 is compact and uncomplicated on its surface. This factor permits of using the change, without structural alterations, in motors both with low and high power, independently of the number of velocity ratios. Coaxiality between the central shaft 7 with desmodromic channels and the main shaft 5 also permits of having reduced axial dimensions, an essential element in motor vehicle design.

The engagement of the various cogged wheels is also very fast and precies, thanks to the presence of a plurality of pivots 9 for each of the cogged wheels 2 commanded both in engagement and in disengagement.

What is claimed is:

1. A change-gear comprising:
    a cylindrical main shaft having a first longitudinal axis, said main shaft being rotatable about the first longitudinal axis;
    a plurality of first cogged wheels, each of said first cogged wheels having a different number of teeth, said first cogged wheels being mounted coaxially onto said main shaft;
    a driven shaft having a second longitudinal axis parallel to the first longitudinal axis, said driven shaft being rotatable about the second longitudinal axis, said driven shaft having a plurality of radial seats;
    a plurality of second cogged wheels mounted rotatably and coaxially on said driven shaft, each of said second cogged wheels having a different number of teeth, each of said second cogged wheels having its teeth meshed with the teeth of a corresponding first cogged wheel, each of said second cogged wheels also having locking means on an internal surface of said each of said second cogged wheels;
    bearing means between each of said second cogged wheels and said driven shaft such that said second cogged wheels may rotate freely with respect to said driven shaft;
    a third shaft nested coaxially and slidably within said driven shaft, said third shaft having a plurality of open longitudinal channels, said channels having channel edges and a decreased depth at an intermediate longitudinal position, said channel edges being immediately adjacent said driven shaft at said intermediate position;
    a set of pivots corresponding to each second cogged wheel, said sets of pivots being slidably retained within said channels, said pivots arranged perpendicular to said third shaft and radially to said driven shaft, each of said pivots having a free end, said free ends extending radially outward from said third shaft and through said seats such that when said third shaft is moved axially to a position at which one of said sets of pivots is positioned at said intermediate position, said free ends of said one set of pivots will be moved radially outward through said seats of said driven shaft to engage said locking means of the respective second cogged wheel and thereby engage the respective second cogged wheel to said driven shaft, the others of said sets of pivots being held radially inward by said channels.

2. A change-gear as in claim 1, wherein said third shaft has three longitudinal channels, said third shaft has a generally circular cross-section, and each of said sets of pivots comprises one pivot retained in each of said channels and engaged to a second cogged wheel.

3. A change-gear as in claim 1, wherein the third shaft has four channels, said third shaft has a generally circular cross-section, and each of said sets of pivots comprises one pivot retained in each of said channels and engaged to a seat of a second cogged wheel.

4. A change gear as in claim 1, wherein said locking means is comprised of circumferential notches formed on the internal circumference of each of said second cogged wheels, the number of said notches corresponding to the number of the respective pivots.

5. A change-gear, comprising:
    a cylindrical main shaft having a first longitudinal axis, said main shaft being rotatable about the first longitudinal axis;
    a plurality of first cogged wheels, each of said first cogged wheels having a different number of teeth, said first cogged wheels being mounted coaxially onto said main shaft;
    a driven shaft having a second longitudinal axis parallel to the first longitudinal axis, said driven shaft being rotatable about the second longitudinal axis, said driven shaft having a plurality of radial seats;
    a plurality of second cogged wheels mounted rotatably and coaxially on said driven shaft, each of said second cogged wheels having a different number of teeth, each of said second cogged wheels having its teeth meshed with the teeth of a corresponding first cogged wheel, each of said second cogged wheels also having locking means on an internal surface of said each of said second cogged wheels;
    bearing means between each of said second cogged wheels and said driven shaft such that said second cogged wheels may rotate freely with respect to said driven shaft;
    a third shaft nested coaxially and slidably within said driven shaft, said third shaft having a plurality of exteriorly open longitudinal channels, said channels having a decreased depth at an intermediate longitudinal position;
    a set of pivots corresponding to each second cogged wheel, said pivots arranged perpendicular to said third shaft and radially to said driven shaft, each of said pivots having a free end, said free ends extending radially outward from said third shaft and through said seats such that when said third shaft is moved axially to a position at which one of said sets of pivots is positioned at said intermediate position, said free ends of said one set of pivots will be moved radially outward through said seats of said driven shaft to engage said locking means of the respective second cogged wheel and thereby engage the respective second cogged wheel to said driven shaft;
    wherein said locking means is comprised of circumferential notches formed on the internal circumference of each of said second cogged wheels, the number of said notches corresponding to the number of the respective pivots; and
    wherein each of said pivots has a circular head and a body having a flat quadrangular shape with a pair of bilateral back drafts such that each of said pivots will form a stable engagement with an end of a corresponding notch.

6. A change gear as in claim 5, wherein each of said back drafts is formed with an angle between 1° and 5°.

7. A change gear as in claim 5, wherein each of said back drafts if formed with an angle of 3°.

* * * * *